United States Patent
Peng

(10) Patent No.: US 11,054,663 B2
(45) Date of Patent: Jul. 6, 2021

(54) IMAGING SYSTEM AND PROJECTION DEVICE

(71) Applicant: Coretronic Corporation, Hsin-Chu (TW)

(72) Inventor: Ken-Teng Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/708,236

(22) Filed: Dec. 9, 2019

(65) Prior Publication Data
US 2020/0183176 A1      Jun. 11, 2020

(30) Foreign Application Priority Data
Dec. 11, 2018   (CN) .......................... 201822071865.3

(51) Int. Cl.
G03B 21/20   (2006.01)
G02B 27/28   (2006.01)
G03B 33/08   (2006.01)

(52) U.S. Cl.
CPC ......... G02B 27/285 (2013.01); G03B 21/204 (2013.01); G03B 33/08 (2013.01)

(58) Field of Classification Search
CPC .... G03B 21/008; G03B 21/28; G03B 21/204; G03B 21/208; G03B 21/2066; G03B 33/02; G03B 33/04; G03B 33/06; G03B 33/08; G03B 33/10; G03B 33/12; G02B 27/09; G02B 27/285; G02B 27/286; G02B 27/0972; G02B 27/1066; G02B 27/4244
See application file for complete search history.

(56) References Cited

U.S. PATENT DOCUMENTS

| | | | |
|---|---|---|---|
| 2008/0088800 A1* | 4/2008 | Bellis | H04N 9/3147 353/30 |
| 2009/0091709 A1* | 4/2009 | Chien | G03B 21/008 353/8 |
| 2016/0119595 A1* | 4/2016 | Lyubarsky | G02B 27/145 353/20 |
| 2018/0239230 A1* | 8/2018 | Pettitt | G03B 33/06 |
| 2018/0259839 A1* | 9/2018 | Okuda | G03B 33/12 |
| 2020/0186762 A1* | 6/2020 | Takahashi | H04N 9/312 |

FOREIGN PATENT DOCUMENTS

| | | |
|---|---|---|
| CN | 1392437 | 1/2003 |
| TW | 201723689 | 7/2017 |

* cited by examiner

*Primary Examiner* — Sultan Chowdhury
(74) *Attorney, Agent, or Firm* — JCIPRNET

(57) ABSTRACT

An imaging system and a projection device are provided. The imaging system includes a first reflective display, a second reflective display, and a light combining element. The first reflective display is configured to provide a first image beam. The second reflective display has the same pixel configuration as the first reflective display, and the second reflective display is configured to provide a second image beam. The light combining element is disposed on transmission paths of the first image beam and the second image beam. The light combining element has a light combining surface, and positions of the first image beam and the second image beam reflected on the light combining surface by pixels in corresponding positions in the first reflective display and the second reflective display are dislocation. The invention maintains good reliability while improving resolution of an image screen.

18 Claims, 12 Drawing Sheets

IMAGING SYSTEM AND PROJECTION DEVICE

CROSS-REFERENCE TO RELATED APPLICATION

This application claims the priority benefit of China application serial no. 201822071865.3, filed on Dec. 11, 2018. The entirety of the above-mentioned patent application is hereby incorporated by reference herein and made a part of this specification.

BACKGROUND OF THE INVENTION

Field of the Invention

The invention relates to an optical system and an electronic device, particularly to an imaging system and a projection device.

Description of Related Art

In order to improve resolution of an image screen output from a projection device, there is a technique of vibrating a lens element (lens or reflective mirror) between a light valve and a projection lens at high speed to cause image misalignment so that the resolution of the image screen can become greater than that of the light valve. However, in this technique, application scope and degree of improvement of resolution of the projection device are limited by vibration limits of the lens element. For example, since an actuation speed of 120 Hz exceeds the vibration limits of the lens element, this technique is incapable of realizing 4K-resolution stereoscopic projection. In addition, a combination of this technique and a 2K-resolution light valve cannot form an 8K-resolution image screen.

The information disclosed in this "BACKGROUND OF THE INVENTION" section is only for enhancement of understanding of the background of the described technology and therefore it may contain information that does not form the prior art that is already known to a person of ordinary skill in the art. The information disclosed in this "BACKGROUND OF THE INVENTION" section does not represent the problems to be resolved by one or more embodiments of the invention, and it also does not mean that the information is acknowledged by a person of ordinary skill in the art before the application of the invention.

SUMMARY

The invention provides an imaging system and a projection device, capable of reducing limits on application scope and degree of improvement of resolution imposed by vibration limits of a lens element.

Other objects and advantages of the invention can be further illustrated by the technical features broadly embodied and described as follows.

In order to achieve one or a portion of or all of the objects or other objects, an embodiment of the invention provides an imaging system including a first reflective display, a second reflective display and a light combining element. The first reflective display is configured to provide a first image beam. The second reflective display has the same pixel configuration as the first reflective display, and the second reflective display is configured to provide a second image beam. The light combining element is disposed on transmission paths of the first image beam and the second image beam. The light combining element has a light combining surface, and positions of the first image beam and the second image beam reflected on the light combining surface by pixels in corresponding positions in the first reflective display and the second reflective display are dislocation.

In order to achieve one or a portion of or all of the objects or other objects, an embodiment of the invention provides a projection device including an illumination system, an imaging system and a projection lens. The illumination system outputs an illumination beam. The imaging system is disposed on a transmission path of the illumination beam from the illumination system, and includes a first reflective display, a second reflective display and a light combining element. The first reflective display is disposed on a transmission path of a first portion of the illumination beam, and converts the first portion of the illumination beam into a first image beam. The second reflective display is disposed on a transmission path of a second portion of the illumination beam, and converts the second portion of the illumination beam into a second image beam. The second reflective display has the same pixel configuration as the first reflective display. The light combining element is disposed on transmission paths of the first image beam from the first reflective display and the second image beam from the second reflective display. The light combining element has a light combining surface, and positions of the first image beam and the second image beam reflected on the light combining surface by pixels in corresponding positions in the first reflective display and the second reflective display are dislocation. The projection lens is disposed on transmission paths of the first image beam and the second image beam from the light combining element.

Based on the above, the embodiments of the invention at least have one of the following advantages or effects. In the embodiments of the imaging system and the projection device of the invention, by controlling the position of at least one of the two reflective displays, the positions of the first image beam and the second image beam reflected on the light combining surface by the pixels in the corresponding positions in the first reflective display and the second reflective display are dislocation. In this way, an image screen formed by the first image beam and an image screen formed by the second image beam are dislocation, thereby improving resolution. Since image misalignment can be achieved without performing high-speed vibration of the lens element, limits on the application scope and the degree of improvement of resolution imposed by vibration limits of the lens element can be reduced, and good reliability can be maintained while the resolution of the image screen is improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
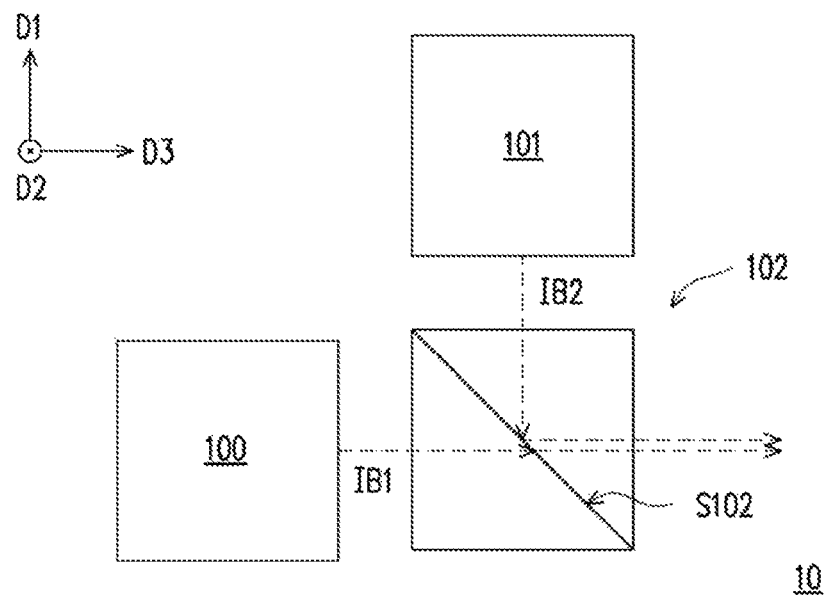
FIG. 1A is a schematic view of a first embodiment of an imaging system of the invention.
Figure 1B:
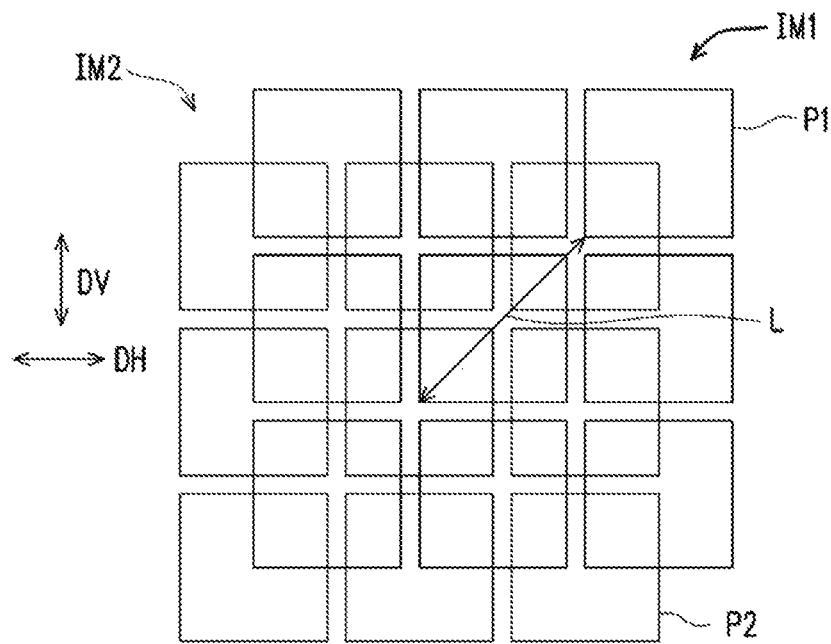
FIG. 1B is a schematic view of an image screen provided by the imaging system of FIG. 1A.

FIG. 1A is a schematic view of a first embodiment of an imaging system of the invention. FIG. 1B is a schematic view of an image screen provided by the imaging system of FIG. 1A. Referring to FIG. 1A and FIG. 1B, an imaging system 10 includes a first reflective display 100, a second reflective display 101, and a light combining element 102.

The first reflective display 100 is configured to provide a first image beam IB1. For example, the first reflective display 100 may be but is not limited to a digital micromirror device (DMD) or a liquid-crystal-on-silicon (LCOS) panel.

The second reflective display 101 is configured to provide a second image beam IB2. For example, the second reflective display 101 may be but is not limited to a DMD or an LCOS panel.

The second reflective display 101 has the same pixel configuration as the first reflective display 100. Herein, the same pixel configuration means that the aforesaid two reflective displays have the same number of pixels and all these pixels are arranged in the same manner. In other words, these two reflective displays may provide image screens having the same resolution, and may also provide the same image screen; in the case where the two reflective displays are aligned, the image screens provided by the two reflective displays are aligned with each other. In addition, when the aforesaid two reflective displays are DMDs, the same pixel configuration means that the two reflective displays have the same number of micromirrors and all these micromirrors are arranged in the same manner.

The light combining element 102 is disposed on a transmission path of the first image beam IB1 and a transmission path of the second image beam IB2. The light combining element 102 has a light combining surface S102. In the embodiment, the light combining surface S102 allows the first image beam IB1 from the first reflective display 100 to pass through and reflects the second image beam IB2 from the second reflective display 101. However, in another embodiment, the light combining surface S102 may reflect the first image beam IB1 and allow the second image beam IB2 to pass through.

By misaligning positions of the first image beam IB1 and the second image beam IB2 reflected on the light combining surface S102 by all pixels (e.g., pixels having the same (X, Y) coordinates in the two reflective displays) in corresponding positions in the first reflective display 100 and the second reflective display 101, an image screen IM1 (FIG. 1B shows each pixel image P1 in the image screen IM1 in thick solid lines) formed by the first image beam IB1 and an image screen IM2 (FIG. 1B shows each pixel image P2 in the image screen IM2 in thin solid lines) formed by the second image beam IB2 can be dislocation, thereby improving the resolution. In the other words, each pixel image P1 of the image screen IM1 (thick solid lines) and each pixel image P2 of the image screen IM2 (thin solid lines) are different locations with a shifting distance. It means that P1 and P2 are misaligned to each other.

A method for misaligning the positions of the two image beams reflected on the light combining surface S102 by the pixels in the corresponding positions as mentioned above may include controlling the position of at least one of the first reflective display 100 and the second reflective display 101. For example, the position of the first reflective display 100 may be changed while fixing the position of the second reflective display 101. For example, the first reflective display 100 may be moved along a first direction D1 (or a direction opposite the first direction D1) and/or a second direction D2 (or a direction opposite the second direction D2) until it is confirmed that the pixel image P1 and the pixel image P2 are offset by half a diagonal length L in a diagonal direction of the pixel image P1 (or the pixel image P2). In this way, compared to a single image screen (e.g., the image screen IM1 or the image screen IM2), an image screen obtained by overlapping the image screen IM1 and the image screen IM2 can have a resolution equal to the original resolution multiplied by the square root of 2 in a horizontal direction DH and a vertical direction DV of the image screen. For example, the two reflective displays have a resolution of 2716×1528, then the resolution of the image screen obtained by overlapping the image screen IM1 and the image screen IM2 in the horizontal direction DH and the vertical direction DV of the image screen is 3840×2160.

However, a control method of the two reflective displays as well as offset direction and offset amount of the pixel images in the two image screens may vary as needed, and are not limited to the above. For example, while the position of the first reflective display 100 is fixed, the position of the second reflective display 101 in the second direction D2 and/or a third direction D3 may be changed to achieve image misalignment. Furthermore, the positions of the first reflective display 100 and the second reflective display 101 may be changed at the same time to achieve image misalignment.

In the embodiment, after the aforesaid step of setting image misalignment, the positions of the first reflective display 100, the second reflective display 101 and the light combining element 102 are fixed. That is, in a subsequent imaging process, image misalignment can be achieved without the need to change the position of any one of the first reflective display 100, the second reflective display 101 and the light combining element 102 all the time or to perform high-speed vibration of the lens element. Since image misalignment can be achieved without performing high-speed vibration of the lens element, limits on application scope and degree of improvement of resolution imposed by vibration limits of the lens element can be reduced, and good reliability can be maintained while the resolution of the image screen is improved. For example, the imaging system 10 may be applied to a high resolution projection device or a high resolution projection device for stereoscopic projection. However, the invention is not limited thereto.

In addition, the imaging system 10 may also be used in conjunction with the lens element vibration technique mentioned in the "BACKGROUND OF THE INVENTION" section. For example, when the imaging system 10 is applied to a high resolution projection device, the first reflective display 100 and the second reflective display 101 may each be a 2K DMD. The resolution of the image screen can be improved to 4K using the technique of the invention. The 4K-resolution image screen is further misaligned by the lens element vibration technique. In this way, a projection effect of 8K resolution can be realized. In another respect, when the imaging system 10 is applied to a high resolution projection device (e.g., 3-D glasses) for stereoscopic projection, after the resolution of the image screen is improved to 4K using the technique of the invention, a 4K-resolution stereoscopic projection effect can be realized at 60 Hz.

Figure 2:
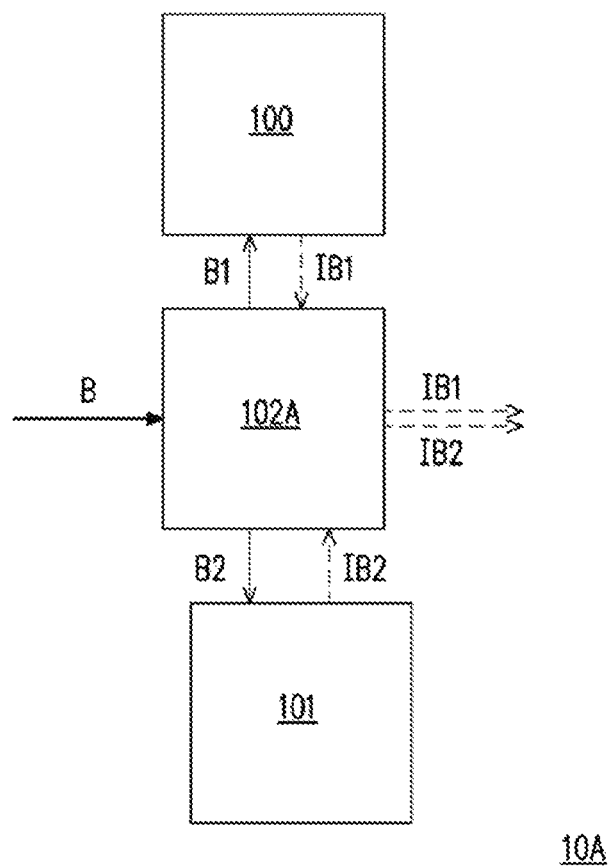
FIG. 2 is a schematic view of a second embodiment of the imaging system of the invention.

FIG. 2 is a schematic view of a second embodiment of the imaging system of the invention. Referring to FIG. 2, differences between an imaging system 10A and the imaging system 10 of FIG. 1A are as explained below. In the imaging system 10A, a light combining element 102A is a polarizing light combining/splitting element. An illumination beam B transmitted to the light combining element 102A is split into a first portion B1 and a second portion B2 by the light combining element 102A. The first portion B1 and the second portion B2 have perpendicular polarization states. For example, the first portion B1 of the illumination beam B and the second portion B2 of the illumination beam B have a P-polarization state and an S-polarization state, respectively.

The first portion B1 and the second portion B2 are respectively transmitted to the first reflective display 100 and the second reflective display 101 via the light combining element 102A. Further, the first reflective display 100 is disposed on a transmission path of the first portion B1 of the illumination beam B. In addition, the first reflective display 100 is configured to convert the first portion B1 into the first image beam IB1 and reflect the first image beam IB1 back to the light combining element 102A. Correspondingly, the first image beam IB1 has the same polarization state (e.g., P-polarization state) as the first portion B1. The second reflective display 101 is disposed on a transmission path of the second portion B2 of the illumination beam B. In addition, the second reflective display 101 is configured to convert the second portion B2 into the second image beam IB2 and reflect the second image beam IB2 back to the light combining element 102A. Correspondingly, the second image beam IB2 has the same polarization state (e.g., S-polarization state) as the second portion B2.

Figure 3A:
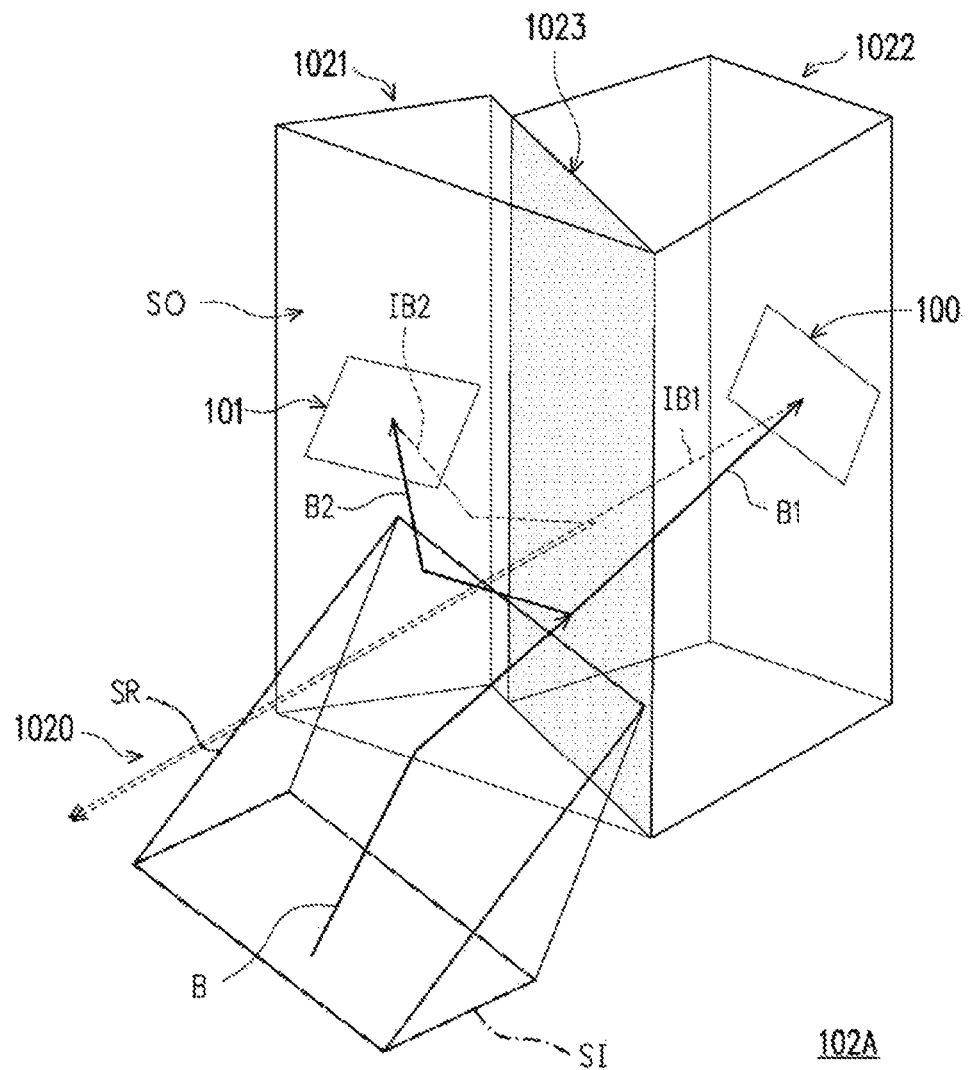
FIG. 3A and FIG. 3B are respectively schematic views of an embodiment of a light combining element of FIG. 2 as viewed from different directions.
Figure 3B:
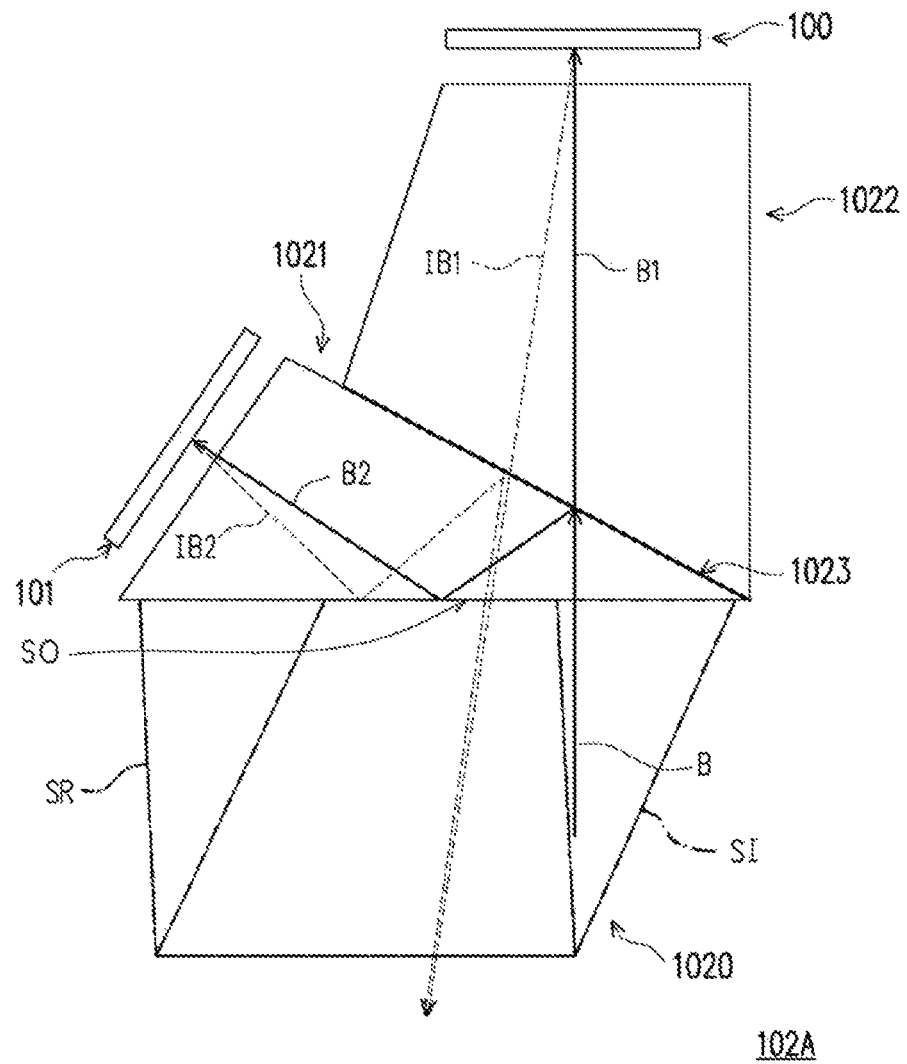

FIG. 3A and FIG. 3B are respectively schematic views of an embodiment of the light combining element 102A of FIG. 2 as viewed from different directions, and FIG. 3A and FIG. 3B further schematically show the first reflective display 100 and the second reflective display 101 of FIG. 2.

Referring to FIG. 3A and FIG. 3B, the light combining element 102A (polarizing light combining/splitting element) includes a first prism 1020, a second prism 1021, a third prism 1022 and a polarizing light combining/splitting layer 1023. The second prism 1021 is disposed between the first prism 1020 and the third prism 1022. The polarizing light combining/splitting layer 1023 (shown in dots in FIG. 3A and indicated by a thick solid line in FIG. 3B) is disposed between the second prism 1021 and the third prism 1022. The illumination beam B is transmitted to the polarizing light combining/splitting layer 1023 via the first prism 1020 and the second prism 1021. The polarizing light combining/splitting layer 1023 allows the first portion B1 and the first image beam IB1 to pass through and reflects the second portion B2 and the second image beam IB2. The first image beam IB1 passing through the polarizing light combining/splitting layer 1023 and the second image beam IB2 reflected by the polarizing light combining/splitting layer 1023 pass through the second prism 1021 and the first prism 1020 in sequence.

In detail, the illumination beam B enters the first prism 1020 from a light entering surface SI (indicated by a dot-and-dash line) of the first prism 1020, and then is reflected by a reflective surface SR (indicated by a double dot-and-dash line) of the first prism 1020 to enter the second prism 1021 and to be transmitted to the polarizing light combining/splitting layer 1023. The polarizing light combining/splitting layer 1023 allows the first portion B1 of the illumination beam B that has a first polarization state (e.g., P-polarization state) to pass through and reflects the second portion B2 that has a second polarization state (e.g., S-polarization state). The first portion B1 passing through the polarizing light combining/splitting layer 1023 penetrates the third prism 1022 and is transmitted to the first reflective display 100. The first reflective display 100 converts the first portion B1 into the first image beam IB1 and reflects the first image beam IB1. The first image beam IB1 reflected by the first reflective display 100 penetrates the third prism 1022, the polarizing light combining/splitting layer 1023 and the second prism 1021 in sequence, and then is emitted from a light exiting surface SO of the second prism 1021. The second portion B2 reflected by the polarizing light combining/splitting layer 1023 is reflected by the light exiting surface SO of the second prism 1021 facing the first prism 1020 and is transmitted to the second reflective display 101. The second reflective display 101 converts the second portion B2 into the second image beam IB2 and reflects the second image beam IB2. The second image beam IB2 reflected by the second reflective display 101 enters the second prism 1021, then is reflected by the light exiting surface SO of the second prism 1021 and the polarizing light combining/splitting layer 1023 in sequence, and then is emitted from the light exiting surface SO of the second prism 1021. In other words, the second portion B2 and the second image beam IB2 do not enter the third prism 1022, i.e., the third prism 1022 is located outside transmission paths of the second portion B2 and the second image beam IB2.

In the embodiment, the first prism 1020 and the second prism 1021 are both triangular prisms. The third prism 1022 is a quadrangular prism. In addition, the first reflective display 100 and the polarizing light combining/splitting layer 1023 are respectively disposed on opposite sides of the third prism 1022. The second reflective display 101, the first prism 1020, and the polarizing light combining/splitting layer 1023 are respectively disposed on three adjacent sides of the second prism 1021. However, the number and shape of elements included in the light combining element 102A (polarizing light combining/splitting element) in FIG. 2 as well as relative arrangement relationship between the elements may vary as needed and are not limited to those shown in FIG. 3A and FIG. 3B.

In FIG. 3A and FIG. 3B, the polarizing light combining/splitting layer 1023 is used not only as the light combining surface but also as a light splitting surface of the light combining element 102A. By misaligning the positions of the first image beam IB1 and the second image beam IB2 reflected on the light combining surface (polarizing light combining/splitting layer 1023) by pixels in corresponding positions in the first reflective display 100 and the second reflective display 101, the image screen IM1 (see FIG. 1B) formed by the first image beam IB1 and the image screen IM2 (see FIG. 1B) formed by the second image beam IB2 can be dislocation, thereby improving the resolution. Application of the imaging system 10A in FIG. 2 may be understood by referring to the above and will not be described again herein.

Figure 4:
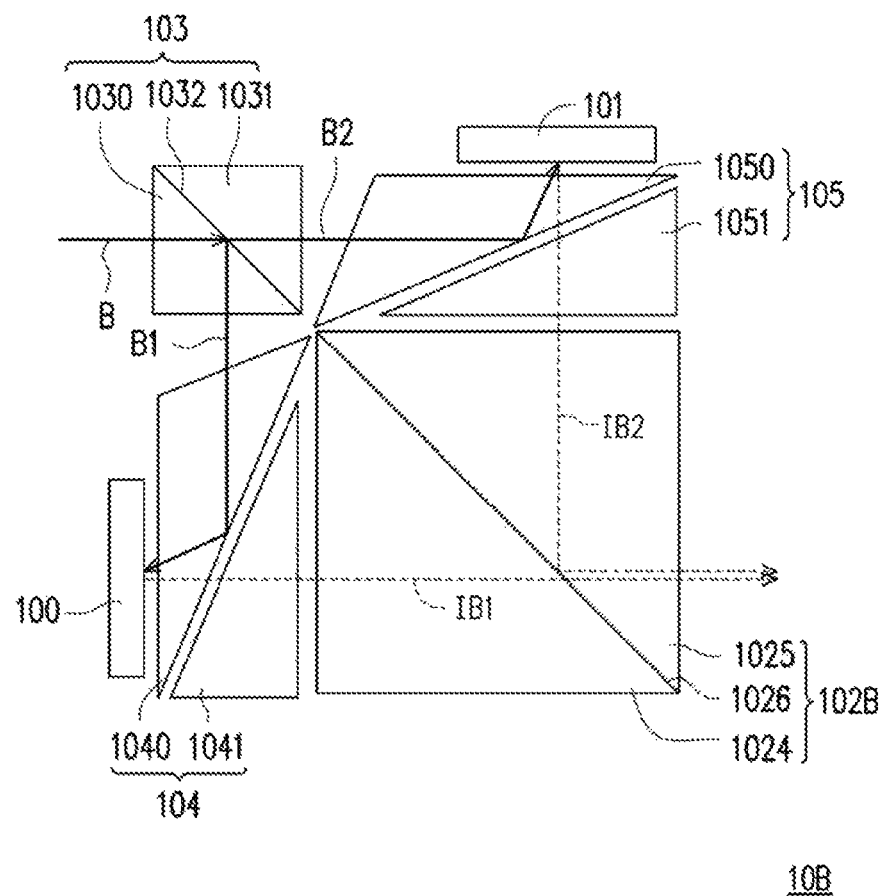
FIG. 4 is a schematic view of a third embodiment of the imaging system of the invention.

FIG. 4 is a schematic view of a third embodiment of the imaging system of the invention. Referring to FIG. 4, differences between an imaging system 10B and the imaging system 10A of FIG. 2 are as explained below. In the imaging system 10A, splitting of the illumination beam B and combining of image beams (e.g., the first image beam IB1 and the second image beam IB2) are both performed by the light combining element 102A. In the imaging system 10B, a light combining element 102B is configured to combine image beams, and the imaging system 10B further includes a polarizing light splitting element 103 configured to split the illumination beam B. In addition, the imaging system 10B further includes a first light transmission element 104 and a second light transmission element 105.

In detail, the polarizing light splitting element 103 is configured to split the illumination beam B into the first portion B1 and the second portion B2. The first portion B1 and the second portion B2 have perpendicular polarization states. For example, the first portion B1 and the second portion B2 have the P-polarization state and the S-polarization state, respectively. Correspondingly, the light combining element 102B is a polarizing light combining element and is disposed on the transmission paths of the first image beam IB1 having the first polarization state (e.g., P-polarization state) and the second image beam IB2 having the second polarization state (e.g., S-polarization state), and the first image beam IB1 and the second image beam IB2 are combined together by the light combining element 102B. In the embodiment, the polarizing light splitting element 103 reflects the first portion B1 and allows the second portion B2 to pass through; the polarizing light combining element (light combining element 102B) allows the first image beam IB1 to pass through and reflects the second image beam IB2. However, the invention is not limited thereto. In another embodiment, the polarizing light splitting element 103 reflects the first portion B1 and allows the second portion B2 to pass through; the polarizing light combining element (light combining element 102B) reflects the first image beam IB1 and allows the second image beam IB2 to pass through.

In the embodiment, the polarizing light splitting element 103 and the polarizing light combining element (light combining element 102B) each include two triangular prisms and a polarizing light combining/splitting layer disposed between the two triangular prisms. As shown in FIG. 4, the polarizing light splitting element 103 includes a triangular prism 1030, a triangular prism 1031, and a polarizing light combining/splitting layer 1032 disposed between the triangular prism 1030 and the triangular prism 1031. The light combining element 102B includes a triangular prism 1024, a triangular prism 1025, and a polarizing light combining/splitting layer 1026 disposed between the triangular prism 1024 and the triangular prism 1025.

The first light transmission element 104 is disposed on the transmission path of the first portion B1 from the polarizing light splitting element 103 and the transmission path of the first image beam IB1 from the first reflective display 100, wherein the first portion B1 from the polarizing light splitting element 103 is transmitted to the first reflective display 100 via the first light transmission element 104, and the first image beam IB1 from the first reflective display 100 is transmitted to the polarizing light combining element (light combining element 102B) via the first light transmission element 104.

The second light transmission element 105 is disposed on the transmission path of the second portion B2 from the polarizing light splitting element 103 and the transmission path of the second image beam IB2 from the second reflective display 101, wherein the second portion B2 from the polarizing light splitting element 103 is transmitted to the second reflective display 101 via the second light transmission element 105, and the second image beam IB2 from the second reflective display 101 is transmitted to the polarizing light combining element (light combining element 102B) via the second light transmission element 105.

In the embodiment, the first light transmission element 104 and the second light transmission element 105 each include two triangular prisms. As shown in FIG. 4, the first light transmission element 104 includes a triangular prism 1040 and a triangular prism 1041, and the second light transmission element 105 includes a triangular prism 1050 and a triangular prism 1051. However, the types and number of elements included in each of the first light transmission element 104 and the second light transmission element 105 may vary as needed and are not limited to those shown in FIG. 4.

The illumination beam B passes through the triangular prism 1030 of the polarizing light splitting element 103 and is transmitted to the polarizing light combining/splitting layer 1032. The polarizing light combining/splitting layer 1032 reflects the first portion B1 of the illumination beam B and allows the second portion B2 to pass through. The first portion B1 reflected by the polarizing light combining/splitting layer 1032 is then reflected by the triangular prism 1040 of the first light transmission element 104 to the first reflective display 100. The first reflective display 100 converts the first portion B1 into the first image beam IB1 and reflects the first image beam IB1. The first image beam IB1 reflected by the first reflective display 100 penetrates the triangular prism 1040, the triangular prism 1041, the triangular prism 1024 of the light combining element 102B, the polarizing light combining/splitting layer 1026 and the triangular prism 1025 in sequence, and then is emitted from the imaging system 10B. The second portion B2 penetrating the polarizing light combining/splitting layer 1032 penetrates the triangular prism 1031 and then is reflected by the triangular prism 1050 of the second light transmission element 105 to the second reflective display 101. The second reflective display 101 converts the second portion B2 into the second image beam IB2 and reflects the second image beam IB2. The second image beam IB2 reflected by the second reflective display 101 penetrates the triangular prism 1050 of the second light transmission element 105, the triangular prism 1051 of the second light transmission element 105, and the triangular prism 1025 of the light combining element 102B in sequence, then is reflected by the polarizing light combining/splitting layer 1026, and then is emitted from the imaging system 10B.

In FIG. 4, the polarizing light combining/splitting layer 1026 is used as a light combining surface of the light combining element 102B. By misaligning the positions of the first image beam IB1 and the second image beam IB2 reflected on the light combining surface (polarizing light combining/splitting layer 1026) by pixels in corresponding positions in the first reflective display 100 and the second reflective display 101, the image screen IM1 (see FIG. 1B) formed by the first image beam IB1 and the image screen IM2 (see FIG. 1B) formed by the second image beam IB2 can be dislocation, thereby improving the resolution. Application of the imaging system 10B in FIG. 4 may be understood by referring to the above and will not be described again herein.

Figure 5:
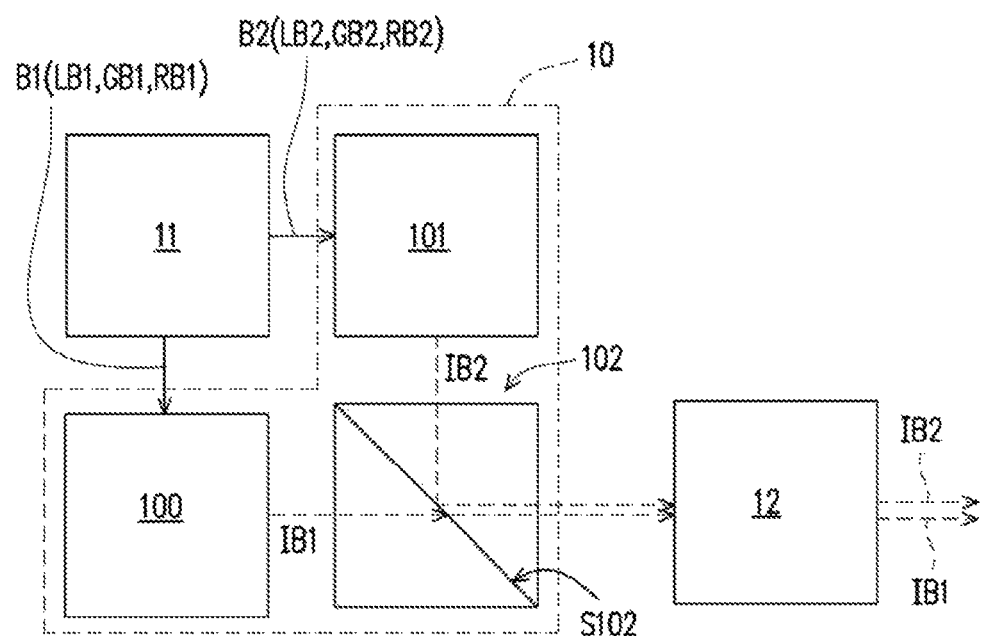
FIG. 5 is a schematic view of a first embodiment of a projection device of the invention.

FIG. 5 is a schematic view of a first embodiment of a projection device of the invention. Referring to FIG. 5, a projection device 1 includes an illumination system 11, the imaging system 10 as shown in FIG. 1A, and a projection lens 12. The illumination system 11 outputs an illumination beam (FIG. 5 shows the first portion B1 and the second portion B2 of the illumination beam). The imaging system 10 is disposed on a transmission path of the illumination beam from the illumination system 11, wherein the content related to the imaging system 10 may be understood by referring to the description of FIG. 1A and will not be repeated herein. The first reflective display 100 is disposed on a transmission path of the first portion B1 of the illumination beam, and converts the first portion B1 of the illumination beam into the first image beam IB1. The second reflective display 101 is disposed on a transmission path of the second portion B2 of the illumination beam, and converts the second portion B2 of the illumination beam into the second image beam IB2. The light combining element 102 is disposed on a transmission path of the first image beam IB1 from the first reflective display 100 and a transmission path of the second image beam IB2 from the second reflective display 101, and the positions of the first image beam IB1 and the second image beam IB2 reflected on the light combining surface S102 by the pixels in corresponding positions in the first reflective display 101 and the second reflective display 102 are dislocation. The projection lens 12 is disposed on transmission paths of the first image beam IB1 and the second image beam IB2 from the light combining element 102.

In detail, the illumination system 11 is configured to output illumination beams of a plurality of colors in a time sequence. That is, the illumination beams of the plurality of colors are respectively output from the illumination system 11 during different time periods, and the illumination system 11 only outputs an illumination beam of one color during each time period. For example, during a first time period, the illumination system 11 outputs a blue beam, i.e., the first portion B1 and the second portion B2 are blue beams during the first time period; during a second time period, the illumination system 11 outputs a green beam, i.e., the first portion B1 and the second portion B2 are green beams during the second time period; and during a third time period, the illumination system 11 outputs a red beam, i.e., the first portion B1 and the second portion B2 are red beams during the third time period. However, the types of colors, number of colors and output order of the illumination beams output from the illumination system 11 are not limited to the above.

Figure 6A:
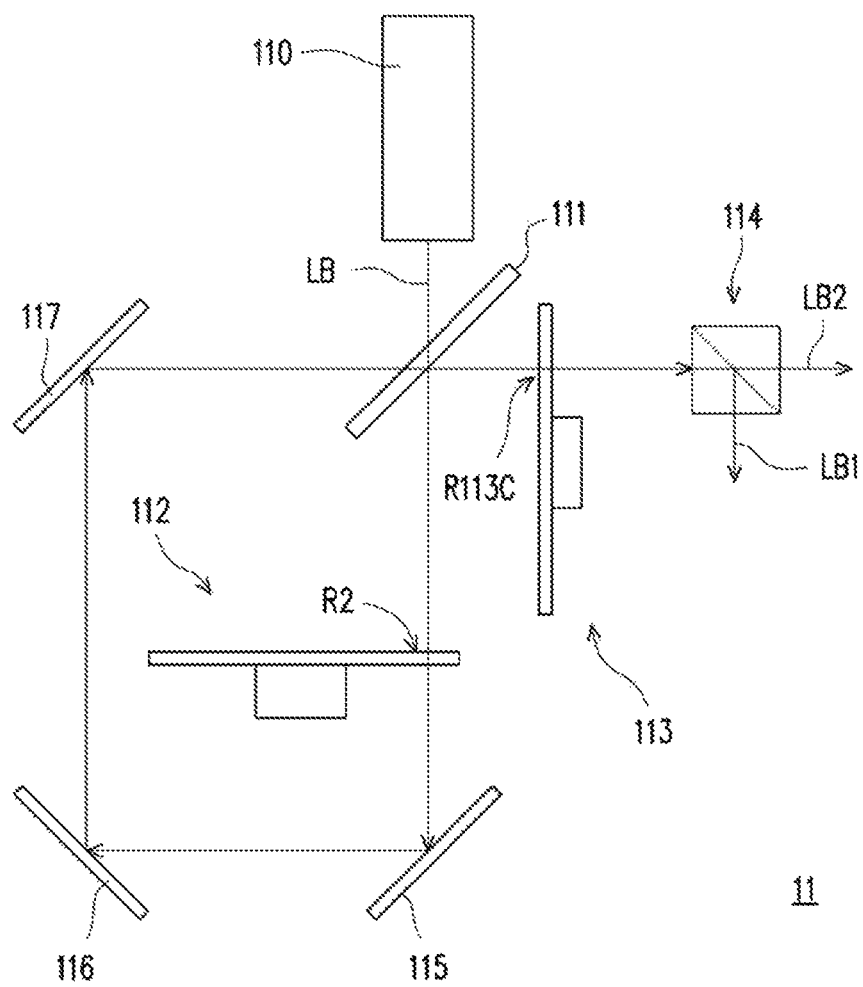
FIG. 6A to FIG. 6C are respectively schematic views of an embodiment of an illumination system of FIG. 5 during different time periods.
Figure 6B:
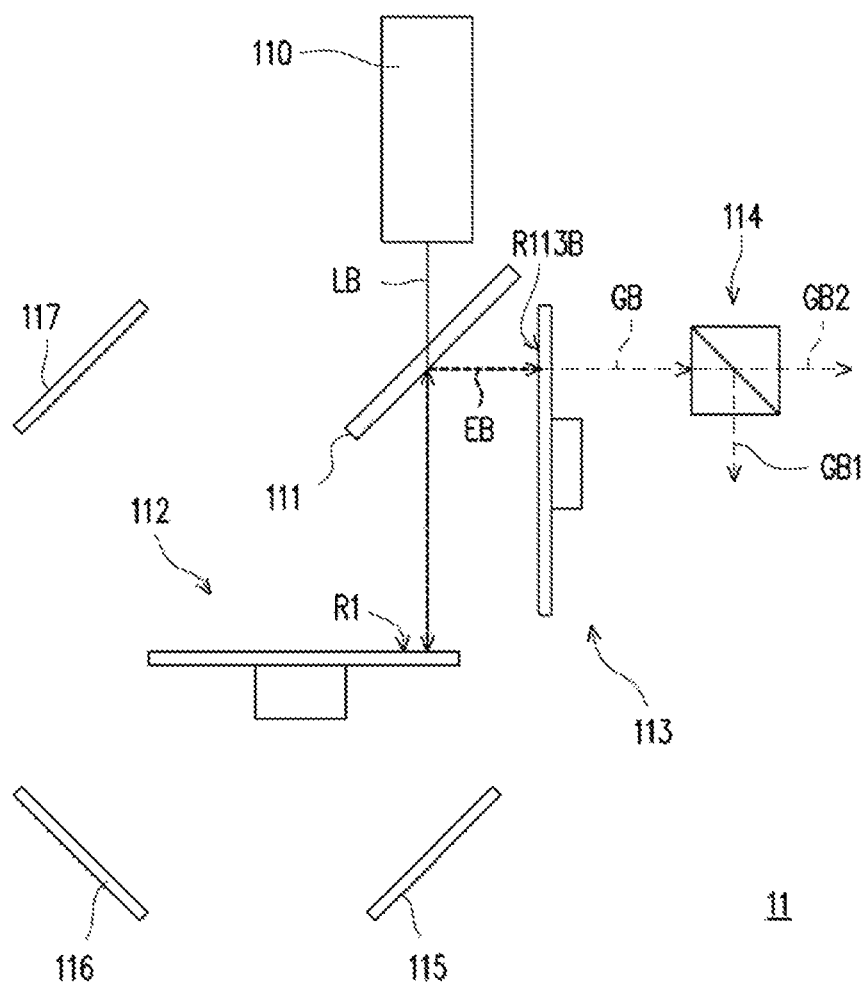
Figure 6C:
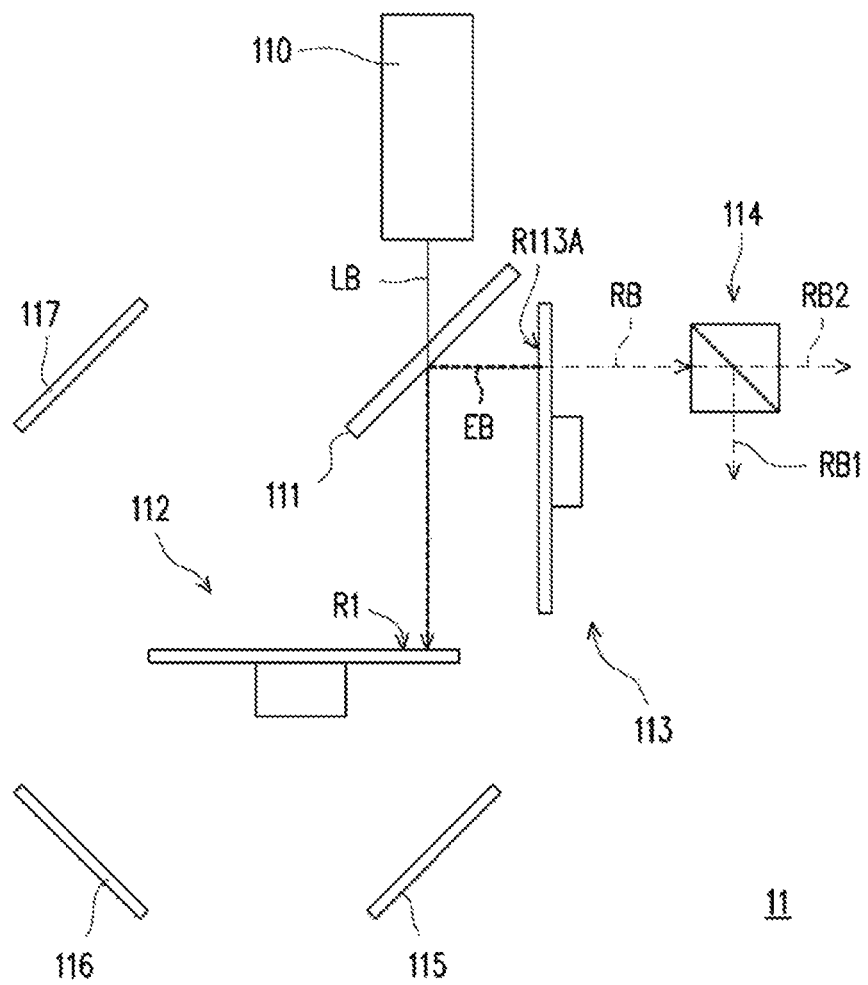

FIG. 6A to FIG. 6C are respectively schematic views of an embodiment of an illumination system of FIG. 5 during different time periods. It should be noted that the illumination system 11 of FIG. 5 may be any of the existing illumination systems, and is not limited to the illumination system shown in FIG. 6A to FIG. 6C.

Referring to FIG. 6A to FIG. 6C, the illumination system 11 may include an excitation light source 110, a light combining element 111, a wavelength conversion module 112, a filter module 113, and a light splitting element 114.

The excitation light source 110 outputs an excitation beam LB. For example, the excitation light source 110 may include a plurality of light emitting elements. The light emitting elements may be a plurality of light emitting diodes, a plurality of laser diodes, or a combination of the above two types of light emitting elements. The excitation beam LB is, for example but not limited to, a blue beam.

The light combining element 111 is disposed on a transmission path of the excitation beam LB from the excitation light source 110. In the embodiment, the light combining element 111 allows the excitation beam LB to pass through, but the invention is not limited thereto. In another embodiment, the light combining element 111 may reflect the excitation beam LB.

The wavelength conversion module 112 is disposed on a transmission path of the excitation beam LB from the light combining element 111, and the wavelength conversion module 112 has a light conversion region R1 and a non-light conversion region R2, wherein the light conversion region R1 and the non-light conversion region R2 alternately cut into the transmission path of the excitation beam LB from the light element 111, and the light conversion region R1 of the wavelength conversion module 112 is adapted to convert the excitation beam LB into a converted beam EB.

Figure 7:
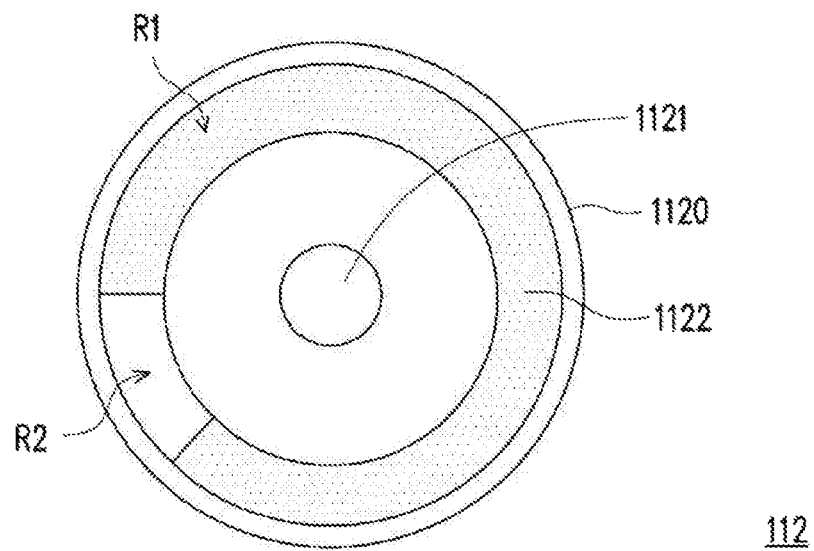
FIG. 7 is a front view of a wavelength conversion module of FIG. 6A to FIG. 6C.

FIG. 7 is a front view of the wavelength conversion module 112 of FIG. 6A to FIG. 6C. Referring to FIG. 7 and FIG. 6A to FIG. 6C, the wavelength conversion module 112 may include a carrier plate 1120, a rotating shaft 1121, and a wavelength conversion layer 1122 (not shown in FIG. 6A to FIG. 6C; please refer to FIG. 7). The rotating shaft 1121 is located in the center of the carrier plate 1120. The light conversion region R1 and the non-light conversion region R2 are arranged around the rotating shaft 1121 along a circumferential direction of the carrier plate 1120, wherein the light conversion region R1 and the non-light conversion region R2 may jointly form a ring shape. The wavelength conversion module 112 is configured to rotate about the rotating shaft 1121 such that the light conversion region R1 and the non-light conversion region R2 alternately cut into the transmission path of the excitation beam LB from the light combining element 111.

The wavelength conversion layer 1122 of the wavelength conversion module 112 is disposed on the carrier plate 1120 and located in an area other than the non-light conversion region R2. In other words, the wavelength conversion layer 1122 is not located in the non-light conversion region R2, and the non-light conversion region R2 is not covered by the wavelength conversion layer 1122. As shown in FIG. 7, the wavelength conversion layer 1122 is disposed in the light conversion region R1. However, the shape and/or arrangement manner of the wavelength conversion layer 1122 is not limited to that shown in FIG. 7.

The wavelength conversion layer 1122 is configured to convert the excitation beam LB into a converted beam (e.g., the converted beam EB as shown in FIG. 6B and FIG. 6C). For example, a material of the wavelength conversion layer 1122 may include phosphors, quantum dots, or a combination of the above two types of light conversion materials. In the embodiment, the converted beam EB is a yellow beam. In addition, the numbers of the light conversion region R1 and the non-light conversion region R2 are each one, wherein the light conversion region R1 cuts into the transmission path of the excitation beam LB from the light element 111 during the second time period shown in FIG. 6B and the third time period shown in FIG. 6C, and the non-light conversion region R2 cuts into the transmission path of the excitation beam LB from the light combining element 111 during the first time period shown in FIG. 6A. However, the color of the converted beam EB, the number of the light conversion region R1 and the number of the non-light conversion region R2 may vary as needed, and are not limited to those shown in FIG. 7. In another embodiment, the wavelength conversion module 112 may have two light conversion regions, for example, a first conversion region converting the excitation beam LB into a green beam (converted beam) and a second conversion region converting the excitation beam LB into a red beam (converted beam). Further, a wavelength conversion layer from which a green beam can be excited and a wavelength conversion layer from which a red beam can be excited are respectively disposed in the first conversion region and the second conversion region.

Referring to FIG. 6A to FIG. 6C, in the embodiment, the non-light conversion region R2 allows the excitation beam LB to pass through (as shown in FIG. 6A), and the light conversion region R1 reflects the converted beam EB (as shown in FIG. 6B and FIG. 6C). Under this architecture, the carrier plate 1120 may be a metal carrier plate, and an opening is formed in the non-light conversion region R2 of the metal carrier plate to allow the excitation beam LB to pass through. Alternatively, the carrier plate 1120 may be a light transmissive carrier plate having a reflective layer formed thereon, and the reflective layer is located in an area other than the non-light conversion region R2, so that the excitation beam LB penetrates the non-light conversion region R2, and the converted beam EB is reflected by the reflective layer disposed in the light conversion region R1. The illumination system 11 may further include a plurality of reflective elements (e.g., a reflective element 115, a reflective element 116 and a reflective element 117). As shown in FIG. 6A, the reflective elements are disposed on a transmission path of the excitation beam LB penetrating the non-light conversion region R2, and transmit the excitation beam LB penetrating the non-light conversion region R2 back to the light combining element 111.

The light combining element 111 is further disposed on transmission paths of the converted beam EB and the excitation beam LB from the wavelength conversion module 112. In the embodiment, the light combining element 111 reflects the converted beam EB, but the invention is not limited thereto. In another embodiment, the light combining element 111 may reflect the excitation beam LB and allow the converted beam EB to pass through.

Figure 8:
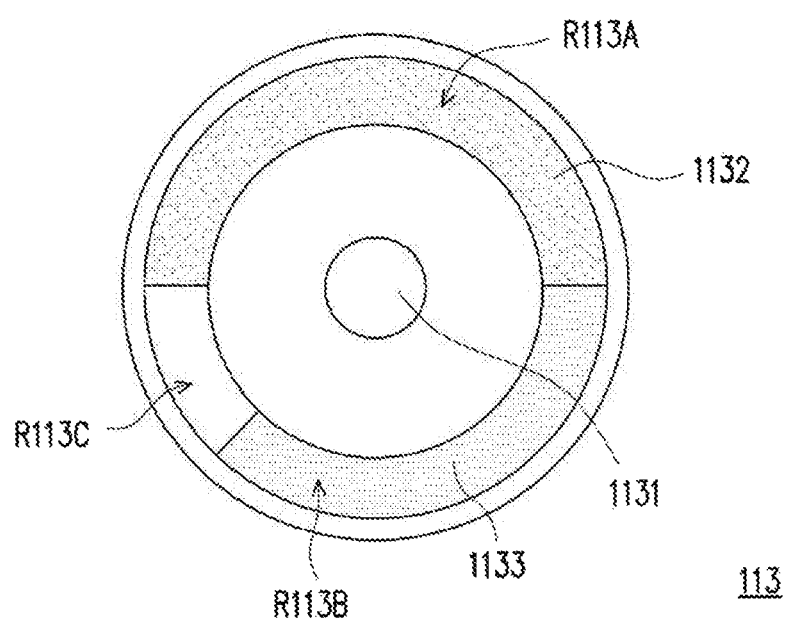
FIG. 8 is a front view of a filter module of FIG. 6A to FIG. 6C.

The filter module 113 is disposed on transmission paths of the converted beam EB and the excitation beam LB from the light combining element 111. FIG. 8 is a front view of the filter module 113 of FIG. 6A to FIG. 6C. Referring to FIG. 8, the filter module 113 may have a first filter region R113A, a second filter region R113B and a third filter region R113C. The first filter region R113A, the second filter region R113B and the third filter region R113C are arranged around a rotating shaft 1131 along a circumferential direction of the filter module 113, wherein the first filter region R113A and the second filter region R113B may jointly form a ring shape, the first filter region R113A and the second filter region R113B are disposed corresponding to the light conversion region R1 of the wavelength conversion module 112, and the third filter region R113C is disposed corresponding to the non-light conversion region R2 of the wavelength conversion module 112. In the embodiment, the first filter region R113A is provided with a red filter 1132 allowing a red beam RB (see FIG. 6C) to pass through and filtering out beams of other colors, and the second filter region R113B is provided with a green filter 1133 allowing a green beam GB (see FIG. 6B) to pass through and filtering out beams of other colors. The third filter region R113C may be provided with a blue filter (not shown) allowing a blue beam (e.g., the excitation beam LB of FIG. 6A) to pass through and filtering out beams of other colors, or may be provided with no filter.

The light splitting element 114 is disposed on a transmission path of a beam (e.g., the excitation beam LB of FIG. 6A, the green beam GB of FIG. 6B, and the red beam RB of FIG. 6C) from the filter module 113 and splits the beam from the filter module 113 into a first portion and a second portion. In the embodiment, the light splitting element 114 in the illumination system 11 may be a general light splitting element and does not need to be a polarizing light splitting element. Correspondingly, the light combining element 102 of FIG. 5 may be a general light combining element and does not need to be a polarizing light combining element. However, in another embodiment, the light splitting element 114 in the illumination system 11 may be a polarizing light splitting element. Correspondingly, the light combining element 102 of FIG. 5 may be a polarizing light combining element.

The wavelength conversion module 112 and the filter module 113 rotate in synchronization. In detail, referring to FIG. 6A, during the first time period, the non-light conversion region R2 of the wavelength conversion module 112 cuts into the transmission path of the excitation beam LB from the light combining element 111, and the third filter region R113C of the filter module 113 cuts into the transmission path of the excitation beam LB from the light combining element 111. The excitation beam LB from the excitation light source 110 penetrates the light combining element 111 and the non-light conversion region R2 of the wavelength conversion module 112 in sequence, then is reflected by the reflective element 115, the reflective element 116 and the reflective element 117 in sequence, and then penetrates the light combining element 111 again. Next, the excitation beam LB that penetrates the light combining element 111 again penetrates the third filter region R113C of the filter module 113, and is split into a first portion LB1 and a second portion LB2 by the light splitting element 114. In other words, during the first time period, the illumination system 11 outputs a blue excitation beam LB (i.e., including the first portion LB1 and the second portion LB2).

Referring to FIG. 6B, during the second time period, the light conversion region R1 of the wavelength conversion module 112 cuts into the transmission path of the excitation beam LB from the light combining element 111, and the second filter region R113B of the filter module 113 cuts into the transmission path of the converted beam EB from the light combining element 111. The excitation beam LB from the excitation light source 110 penetrates the light combining element 111 and then is transmitted to the light conversion region R1 of the wavelength conversion module 112. The light conversion region R1 converts the excitation beam LB into the converted beam EB (e.g., yellow beam) and reflects the converted beam EB back to the light combining element 111. The light combining element 111 reflects the converted beam EB. The converted beam EB reflected by the light combining element 111 is transmitted to the second filter region R113B of the filter module 113. The second filter region R113B allows the green beam GB in the converted beam EB to pass through and filters out beams of other colors. The green beam GB is split into a first portion GB1 and a second portion GB2 by the light splitting element 114. In other words, during the second time period, the illumination system 11 outputs the green beam GB (i.e., including the first portion GB1 and the second portion GB2).

Referring to FIG. 6C, during the third time period, the light conversion region R1 of the wavelength conversion module 112 cuts into the transmission path of the excitation beam LB from the light combining element 111, and the first filter region R113A of the filter module 113 cuts into the transmission path of the converted beam EB from the light combining element 111. In FIG. 6C, the transmission path of the excitation beam LB and the converted beam EB may be understood by referring to the description of FIG. 6B, and will not be described again herein. FIG. 6C differs from FIG. 6B in that, during the third time period, the first filter region R113A of the filter module 113 cuts into the transmission path of the converted beam EB from the light combining element 111, and the first filter region R113A allows the red beam RB in the converted beam EB to pass through and filters out beams of other colors. The red beam RB is split into a first portion RB1 and a second portion RB2 by the light splitting element 114. In other words, during the third time period, the illumination system 11 outputs the red beam RB (i.e., including the first portion RB1 and the second portion RB2).

The illumination system 11 may further include other elements depending on different needs. For example, the illumination system 11 may further include a plurality of lens elements (not shown). The lens elements may be disposed between any two elements of the illumination system 11 to provide effects such as converging or collimating beams. In addition, the illumination system 11 may further include a light homogenizing element (not shown), for example but not limited to, a light integration rod.

Referring again to FIG. 5, during the first time period to the third time period, the first reflective display 100 converts the first portions LB1, GB1 and RB1 from the illumination system 11 into a first blue image beam, a first green image beam and a first red image beam, respectively (FIG. 5 only schematically shows the first image beam IB1), and the second reflective display 101 converts the second portions LB2, GB2 and RB2 from the illumination system 11 into a second blue image beam, a second green image beam and a second red image beam, respectively (FIG. 5 only schematically shows the second image beam IB2).

The light combining element 102 is disposed on the transmission path of the first image beam IB1 from the first reflective display 100 and the transmission path of the second image beam IB2 from the second reflective display 101. During the first time period, the light combining element 102 combines the first blue image beam with the second blue image beam. During the second time period, the light combining element 102 combines the first green image beam with the second green image beam. During the third time period, the light combining element 102 combines the first red image beam with the second red image beam.

The projection lens 12 is disposed on transmission paths of the first image beam IB1 and the second image beam IB2. During the first time period, the projection lens 12 projects a combined blue image beam onto an imaging surface. During the second time period, the projection lens 12 projects a combined green image beam onto the imaging surface. During the third time period, the projection lens 12 projects a combined red image beam onto the imaging surface. The projection lens 12 may be an existing projection lens, and will not be described herein.

By the aforesaid arrangement of the imaging system 10, the image screen projected by the projection lens 12 during each time period is formed by overlapping the image screen IM1 and the image screen IM2 in FIG. 1B. Therefore, the resolution of the image screen projected by the projection lens 12 can become greater than the resolution of a single reflective display. When the pixel image P1 in the image screen IM1 (see FIG. 1B) projected by the projection lens 12 and the pixel image P2 in the image screen IM2 projected by the projection lens 12 are offset by half the diagonal length L in the diagonal direction of the pixel image P1 (or the pixel image P2), the image screen obtained by overlapping the two image screens can have a resolution equal to the original resolution multiplied by the square root of 2 in the horizontal direction DH and the vertical direction DV of the image screen.

Figure 9:
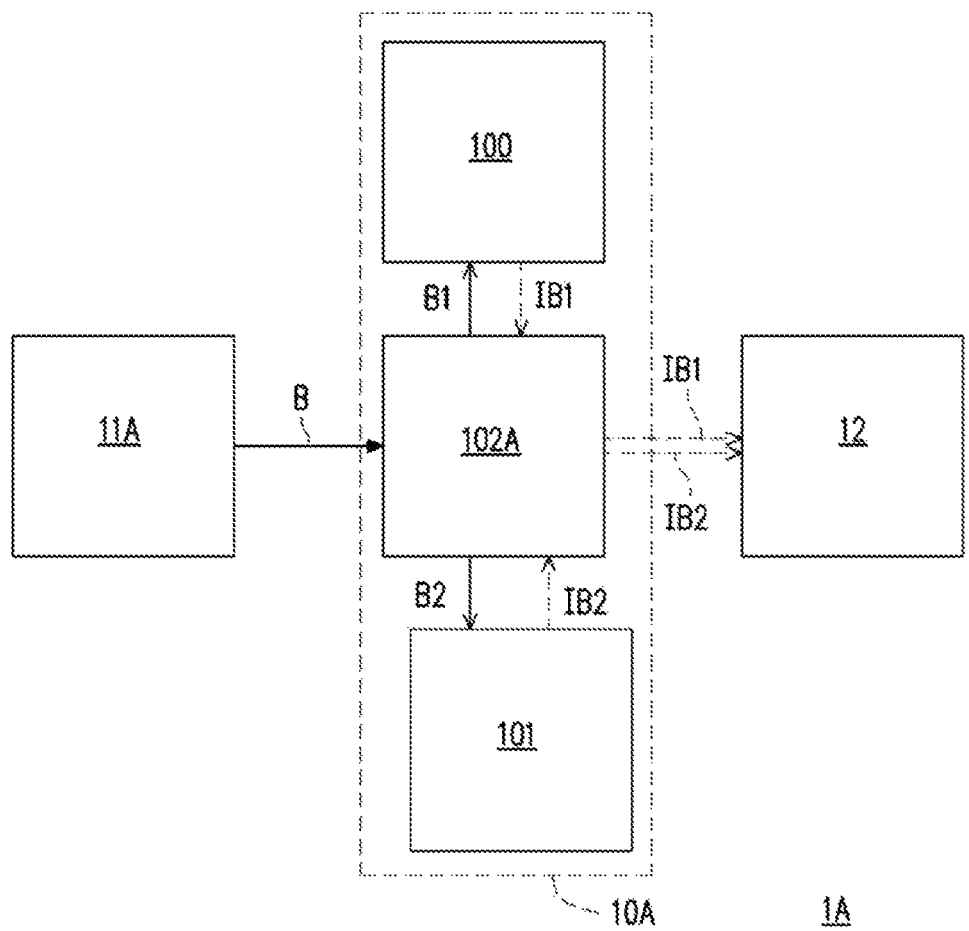
FIG. 9 is a schematic view of a second embodiment of the projection device of the invention.

FIG. 9 is a schematic view of a second embodiment of the projection device of the invention. Referring to FIG. 9, differences between a projection device 1A and the imaging system 1 of FIG. 5 are as explained below. In the projection device 1A, the illumination system 11A may be the illumination system shown in FIG. 6A to FIG. 6C or any of the existing illumination systems. Under the architecture of the illumination system shown in FIG. 6A to FIG. 6C, the splitting of the illumination beam B can be performed by the light combining element 102A, and thus the light splitting element 114 of FIG. 6A to FIG. 6C may be omitted from the illumination system 11A. The content related to the imaging system 10A of FIG. 9 may be understood by referring to the description of FIG. 2 and will not be repeated herein.

Figure 10:
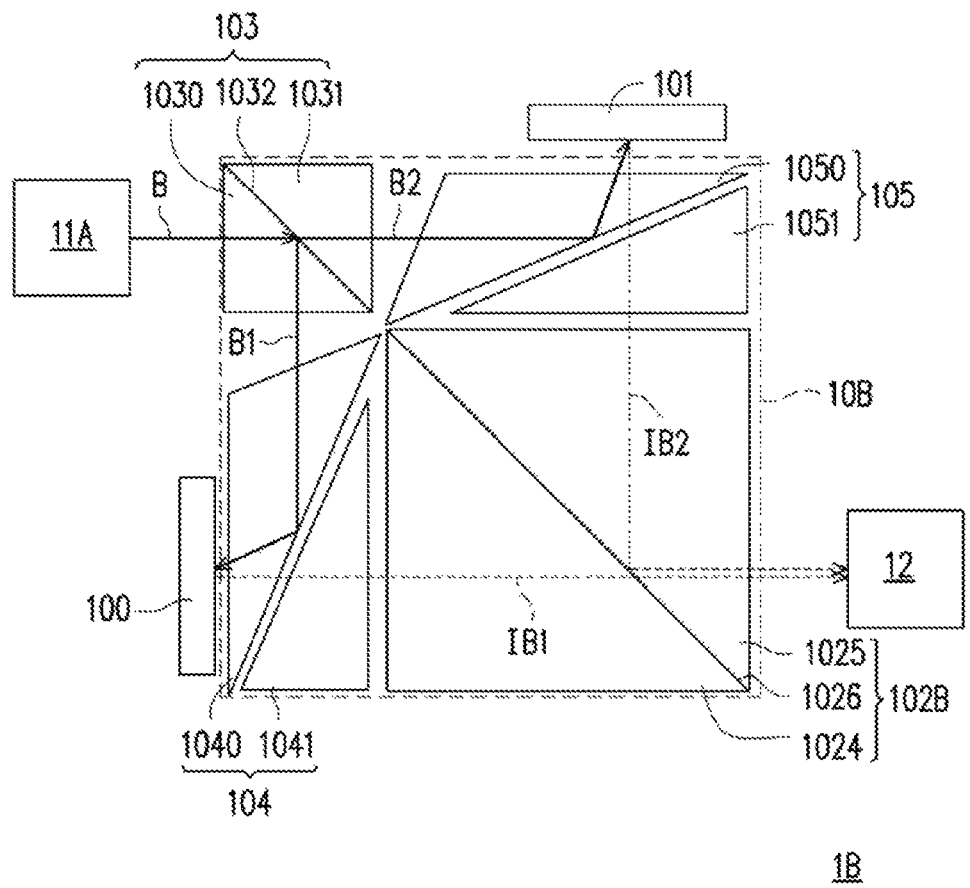
FIG. 10 is a schematic view of a third embodiment of the projection device of the invention.

FIG. 10 is a schematic view of a third embodiment of the projection device of the invention. Referring to FIG. 10, differences between a projection device 1B and the projection device 1A of FIG. 9 are as explained below. In the projection device 1B, the imaging system 10A of FIG. 9 is replaced with the imaging system 10B. The content related to the imaging system 10B of FIG. 10 may be understood by referring to the description of FIG. 4 and will not be repeated herein.

In summary, the embodiments of the invention at least have one of the following advantages or effects. In the embodiments of the imaging system and the projection device of the invention, by controlling the position of at least one of the two reflective displays, the positions of the first image beam and the second image beam reflected on the light combining surface by the pixels in the corresponding positions in the first reflective display and the second reflective display are dislocation. In this way, an image screen formed by the first image beam and an image screen formed by the second image beam are dislocation, thereby improving resolution. Since image misalignment can be achieved without performing high-speed vibration of the lens element, limits on the application scope and the degree of improvement of resolution imposed by vibration limits of the lens element can be reduced, and good reliability can be maintained while the resolution of the image screen is improved. In one embodiment, the two image screens are offset by half the diagonal length in the diagonal direction of the pixel image. In another embodiment, the light combining element is a polarizing light combining/splitting element. In still another embodiment, the light combining element is a polarizing light combining element, and the imaging system further includes a polarizing light splitting element.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An imaging system comprising:
a first reflective display configured to provide a first image beam;
a second reflective display configured to provide a second image beam, wherein the second reflective display has the same pixel configuration as the first reflective display; and
a light combining element disposed on transmission paths of the first image beam and the second image beam, wherein the light combining element has a light combining surface, and positions of the first image beam and the second image beam reflected on the light combining surface by pixels in corresponding positions in the first reflective display and the second reflective display are dislocation, wherein the light combining element comprises a first prism, a second prism, a third prism, and a polarizing light combining/splitting layer, the second prism is disposed between the first prism and the third prism, the polarizing light combining/splitting layer is disposed between the second prism and the third prism, and the first image beam passing through the polarizing light combining/splitting layer and the second image beam reflected by the polarizing light combining/splitting layer pass through the second prism and the first prism in sequence.

2. The imaging system of claim 1, wherein the light combining element is a polarizing light combining/splitting element, an illumination beam transmitted to the light combining element is split into a first portion and a second portion by the light combining element, the first portion and the second portion have perpendicular polarization states, the first reflective display is disposed on a transmission path of the first portion and converts the first portion into the first image beam, and the second reflective display is disposed on a transmission path of the second portion and converts the second portion into the second image beam.

3. The imaging system of claim 2, wherein the illumination beam is transmitted to the polarizing light combining/splitting layer via the first prism and the second prism, the polarizing light combining/splitting layer allows the first portion and the first image beam to pass through and reflects the second portion and the second image beam.

4. The imaging system of claim 3, wherein the third prism is located outside transmission paths of the second portion and the second image beam.

5. The imaging system of claim 3, wherein the first prism and the second prism are both triangular prisms, the third prism is a quadrangular prism, the first reflective display and the polarizing light combining/splitting layer are respectively disposed on opposite sides of the third prism, and the second reflective display, the first prism, and the polarizing light combining/splitting layer are respectively disposed on three adjacent sides of the second prism.

6. An imaging system comprising:
a first reflective display configured to provide a first image beam;
a second reflective display configured to provide a second image beam, wherein the second reflective display has the same pixel configuration as the first reflective display; and
a light combining element disposed on transmission paths of the first image beam and the second image beam, wherein the light combining element has a light combining surface, and positions of the first image beam and the second image beam reflected on the light combining surface by pixels in corresponding positions in the first reflective display and the second reflective display are dislocation, wherein the light combining element is a polarizing light combining element, and the imaging system further comprises:
a polarizing light splitting element configured to split an illumination beam into a first portion and a second portion, wherein the first portion and the second portion have perpendicular polarization states, the first reflective display is disposed on a transmission path of the first portion and converts the first portion into the first image beam, and the second reflective display is disposed on a transmission path of the second portion and converts the second portion into the second image beam, wherein the polarizing light splitting element reflects the first portion and allows the second portion to pass through, and the polarizing light combining element allows the first image beam to pass through and reflects the second image beam.

7. The imaging system of claim 6, wherein the polarizing light splitting element reflects the first portion and allows the second portion to pass through, and the polarizing light combining element reflects the first image beam and allows the second image beam to pass through.

8. The imaging system of claim 6, wherein the polarizing light splitting element and the polarizing light combining element each comprises two triangular prisms and a polarizing light combining/splitting layer disposed between the two triangular prisms.

9. The imaging system of claim 6, wherein the imaging system further comprises:
a first light transmission element, wherein the first portion from the polarizing light splitting element is transmitted to the first reflective display via the first light transmission element, and the first image beam from the first reflective display is transmitted to the polarizing light combining element via the first light transmission element; and
a second light transmission element, wherein the second portion from the polarizing light splitting element is transmitted to the second reflective display via the second light transmission element, and the second image beam from the second reflective display is transmitted to the polarizing light combining element via the second light transmission element.

10. A projection device comprising:
an illumination system outputting an illumination beam;
an imaging system disposed on a transmission path of the illumination beam from the illumination system, and the imaging system comprising:
a first reflective display disposed on a transmission path of a first portion of the illumination beam, wherein the first reflective display converts the first portion of the illumination beam into a first image beam;
a second reflective display disposed on a transmission path of a second portion of the illumination beam, wherein the second reflective display converts the second portion of the illumination beam into a second image beam, and the second reflective display has the same pixel configuration as the first reflective display; and
a light combining element disposed on transmission paths of the first image beam from the first reflective display and the second image beam from the second reflective display, wherein the light combining element has a light combining surface, and positions of the first image beam and the second image beam reflected on the light combining surface by pixels in corresponding positions in the first reflective display and the second reflective display are dislocation, wherein the light combining element comprises a first prism, a second prism, a third prism, and a polarizing light combining/splitting layer, the second prism is disposed between the first prism and the third prism, the polarizing light combining/splitting layer is disposed between the second prism and the third prism, and the first image beam passing through the polarizing light combining/splitting layer and the second image beam reflected by the polarizing light combining/splitting layer are transmitted to the projection lens via the second prism and the first prism; and
a projection lens disposed on transmission paths of the first image beam and the second image beam from the light combining element.

11. The projection device of claim 10, wherein the light combining element is a polarizing light combining/splitting element, the illumination beam from the illumination system is split into the first portion and the second portion by the light combining element, the first portion and the second portion have perpendicular polarization states, and the first portion and the second portion are respectively transmitted to the first reflective display and the second reflective display via the light combining element.

12. The projection device of claim 11, wherein the illumination beam is transmitted to the polarizing light combining/splitting layer via the first prism and the second prism, the polarizing light combining/splitting layer allows the first portion and the first image beam to pass through and reflects the second portion and the second image beam.

13. The projection device of claim 12, wherein the third prism is located outside transmission paths of the second portion and the second image beam.

14. The projection device of claim 12, wherein the first prism and the second prism are both triangular prisms, the third prism is a quadrangular prism, the first reflective display and the polarizing light combining/splitting layer are respectively disposed on opposite sides of the third prism, and the second reflective display, the first prism, and the polarizing light combining/splitting layer are respectively disposed on three adjacent sides of the second prism.

15. A projection device comprising:
an illumination system outputting an illumination beam;
an imaging system disposed on a transmission path of the illumination beam from the illumination system, and the imaging system comprising:
a first reflective display disposed on a transmission path of a first portion of the illumination beam, wherein the first reflective display converts the first portion of the illumination beam into a first image beam;
a second reflective display disposed on a transmission path of a second portion of the illumination beam, wherein the second reflective display converts the second portion of the illumination beam into a second image beam, and the second reflective display has the same pixel configuration as the first reflective display; and
a light combining element disposed on transmission paths of the first image beam from the first reflective display and the second image beam from the second reflective display, wherein the light combining element has a light combining surface, and positions of the first image beam and the second image beam reflected on the light combining surface by pixels in corresponding positions in the first reflective display and the second reflective display are dislocation; and a projection lens disposed on transmission paths of the first image beam and the second image beam from the light combining element, wherein the light combining element is a polarizing light combining element, and the imaging system further comprises:

a polarizing light splitting element splitting the illumination beam into the first portion and the second portion, and the first portion and the second portion having perpendicular polarization states, wherein the polarizing light splitting element reflects the first portion and allows the second portion to pass through, and the polarizing light combining element allows the first image beam to pass through and reflects the second image beam.

16. The projection device of claim 15, wherein the polarizing light splitting element reflects the first portion and allows the second portion to pass through, and the polarizing light combining element reflects the first image beam and allows the second image beam to pass through.

17. The projection device of claim 15, wherein the polarizing light splitting element and the polarizing light combining element each comprises two triangular prisms and a polarizing light combining/splitting layer disposed between the two triangular prisms.

18. The projection device of claim 15, wherein the imaging system further comprises:

a first light transmission element, wherein the first portion from the polarizing light splitting element is transmitted to the first reflective display via the first light transmission element, and the first image beam from the first reflective display is transmitted to the polarizing light combining element via the first light transmission element; and a second light transmission element, wherein the second portion from the polarizing light splitting element is transmitted to the second reflective display via the second light transmission element, and the second image beam from the second reflective display is transmitted to the polarizing light combining element via the second light transmission element.

* * * * *